Nov. 21, 1950          L. BLOK          2,530,596
MEASURING CIRCUITS FOR INTERMODULATION MEASUREMENTS
Filed July 16, 1946
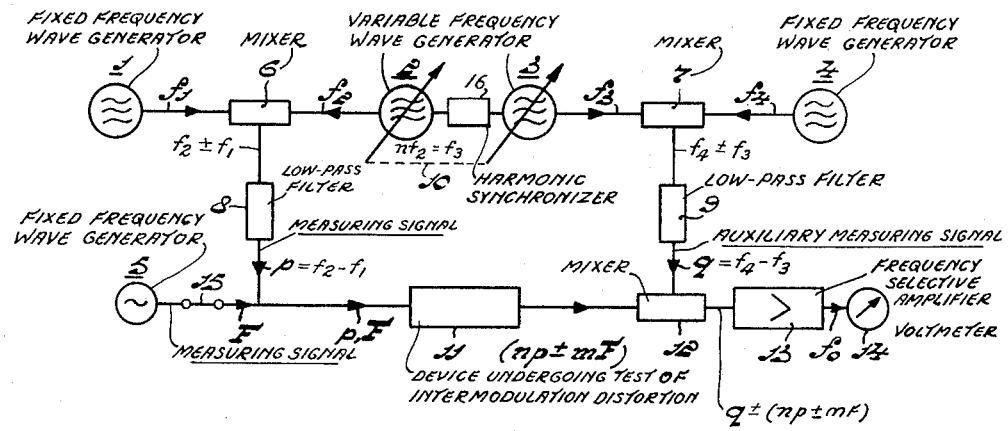
INVENTOR
LOURENS BLOK
BY
AGENT Patented Nov. 21, 1950

2,530,596

UNITED STATES PATENT OFFICE 2,530,596

MEASURING CIRCUITS FOR INTERMODULATION MEASUREMENTS

Lourens Blok, Eindhoven, Netherlands, assignor to Hartford National Bank and Trust Company, Hartford, Conn., as trustee Application July 16, 1946, Serial No. 684,069
In the Netherlands January 15, 1943

Section 1, Public Law 690, August 8, 1946
Patent expires January 15, 1963

7 Claims. (Cl. 175—183)

For determining distortion occurring due to intermodulation in a transmission circuit or generally in an object to be measured, it is known to utilize a measuring circuit wherein two measuring signals of such variable frequency are supplied to the object to be measured that the frequency of an intermodulation product of the first or of higher order, which product is taken from the object to be measured, exhibits an invariable value. The amplitude of the intermodulation product of invariable frequency may then be determined with the aid of a highly selective voltmeter tuned to a definite frequency as a function of the measuring signal frequencies.

The invention has for its object an improved measuring system for intermodulation measurements.

In the measuring circuit according to the invention a signal of invariable frequency (F) and a signal of variable frequency ($p$) are supplied to the object to be measured for the purpose of intermodulation measurement.

The invention is based on the recognition that with the aid of the known measuring circuits it is not always possible to obtain an exact notion of the distortion occurring due to intermodulation. The measurement is effected, for example, with the aid of two measuring signals which pass, for example, while maintaining a constant frequency difference of 1000 cycles, through a frequency range of 30 to 10,000 cycles. In determining intermodulation of the first order, for example, at 6,000 cycles the frequency of the one measuring signal amounts to 6,000 cycles and the frequency of the other measuring signal to 7,000 cycles, the amplitude of the intermodulation product being determined with a frequency of 1,000 cycles. However, this amplitude is not only dependent upon the frequency of the one measuring signal (6,000 cycles) but also upon the frequency of the second measuring signal (7,000 cycles) so that, depending upon the characteristics of the object to be measured, it would be possible to obtain a quite different measuring result at 6,000 cycles if the frequency of the second measuring signal amounted, for example, to 8,000 cycles or again, for example, to 100 cycles. All this implies, moreover, that the measurements of intermodulation products of different order cannot directly be compared with one another.

In the measuring circuit according to the invention these drawbacks are avoided owing to the fact that the frequency of the one measuring signal exhibits a fixed value and that only the frequency of the other measuring signal is variable.

The fixed frequency may be chosen in this case in accordance with a frequency which is critical for the object to be measured in connection with intermodulation.

With amplifiers comprising transformers and the like the lowest frequencies to be transmitted are generally the most critical ones in view of which, for example, a fixed frequency of approximately 30 cycles is chosen.

With other objects to be measured, for example, resistance-coupled amplifiers with a negative feedback dependent upon frequency, the limit frequencies of the negative feedback circuit are usually critical in connection with intermodulation.

According to a further feature of the invention, in order to be able, with the use of the measuring circuit according to the invention, to effectuate the measurement of the intermodulation products, as is known in itself, with the aid of a selective voltmeter tuned to a definite frequency the intermodulation product to be measured of the two measuring signals ($np+mF$) is mixed with an auxiliary signal $q$ whose frequency is variable, simultaneously with that of the measuring signal $p$, in such manner that a combination frequency of the two last-mentioned signals ($q \pm np$) has a constant value whilst the combination frequency of the intermodulation product and the auxiliary measuring signal $q \pm (np \pm mF)$, which frequency corresponds to the first-mentioned combination frequency, is supplied to a selective voltmeter tuned to a definite frequency.

The invention will be explained more fully with reference to the accompanying drawing, which represents one particularly advantageous form of construction of a measuring system according to the invention.

The measuring system shown comprises four high-frequency generators 1, 2, 3 and 4, viz. two auxiliary signal generators 1 and 4 tuned to predetermined fixed frequencies $f_1$ and $f_2$ respectively, two auxiliary signal generators 2 and 3 which serve to generate auxiliary signals $f_2$ and $f_3$ respectively of variable frequency and finally a fifth generator 5 which furnishes the required measuring signal of fixed frequency F.

The generators 1, 2, 3 and 4 are utilized to obtain the measuring signal of variable frequency $p$ and the auxiliary measuring signal $q$ also of variable frequency. For this purpose the auxiliary signals $f_2$ and $f_3$ are mixed with the auxiliary signals $f_1$ and $f_4$ respectively in frequency changers 6 and 7 respectively. The differential frequencies of the first order thus produced, which form the measuring signals $p$ and $q$, are separated by means of low-pass filters 8 and 9 from other combination frequencies so that they may be taken from the output circuits of these filters.

In order to ensure for the previously mentioned reasons that the measuring signals $p$ and $q$ are variable in frequency in such manner that a combination frequency thereof $(q \pm np)$ exhibits a constant value, the generators 2 and 3 may be tuned by means of a common operating member 10, and this in such manner that the equation $$nf_2 = f_3$$

wherein $n$ is an arbitrary integer or the reciprocal value thereof, is always valid.

If desired, the required harmonic relation between $f_2$ and $f_3$ may be rigorously maintained by a device 16 effecting mutual synchronization of the generators 2 and 3.

If there exists the above-mentioned relation between $f_2$ and $f_3$, then $$q = f_4 - f_3$$
$$np = n(f_1 - f_2) = nf_1 - f_3$$

and therefore $(q - np) = (f_4 - nf_1)$

The differential frequency $(q - np)$ consequently has a constant value which does not vary upon variation of the frequencies of the signals $p$ and $q$ by actuating the actuating member 10 since both $f_1$ and $f_2$ are maintained invariable.

Instead of giving a constant value to an arbitrarily chosen differential frequency, it is also possible to give such a value to an arbitrary sum frequency. The first case occurs if $f_3 < f_1$ and $f_3 < f_4$ whilst the second case occurs if $f_1 > f_3 > f_4$.

Together with the measuring signal F whose frequency is in principle invariable, the measuring signal $p$ of variable frequency is supplied to the input terminals of a measuring object 11; in the output circuit of the latter there will now be obtained, due to intermodulation phenomena, arbitrary intermodulation products with a frequency $(np \pm mF)$ ($n$ and $m$ being harmonic order coefficients).

In order to be able to measure the amplitude of these intermodulation products with the aid of a highly selective voltmeter tuned to a definite frequency, they are mixed with the auxiliary measuring signal $q$ in a frequency changer 12. A signal of differential frequency $[q - (np \pm mF)]$ may now be taken from the said frequency changer. The frequency of the last-mentioned signal does not vary upon variation of the frequencies $p$ and $q$ if only the differential frequency of the signals $p$ and $q$, vid. $(q - np)$, which corresponds to the above-mentioned differential frequency, is independent of the frequencies $p$ and $q$; such is the case with the system represented, as has been set out hereinbefore.

Since $q - np = (f_4 - nf_1)$, the frequency of the signal taken from the frequency changer amounts to $$[q - (np \pm mF)] = (f_4 - nf_1 \pm mF)$$

After being amplified with the aid of a highly selective amplifier 13 tuned to a definite frequency, this signal of constant frequency is supplied to a voltmeter, such as a vacuum tube voltmeter 14.

In order to avoid that upon a change in the choice of the order coefficient $n$ it would be necessary to modify the tuning frequency of the amplifier 13, care may be taken to ensure that the product $nf_1$ retains the same value upon variation of $n$ by modifying $f_1$ in accordance therewith. Since, as has previously been mentioned, the equation $nf_2 = f_3$ must always be valid and since consequently upon variation of $n$ also the frequency $f_2$ must be varied in such manner that the product $nf_2$ retains the same value, the generators 1 and 2 may be constructed in view thereof so as to permit changeover with the aid of a common actuating member.

Here it may be mentioned that, if the measuring system according to the invention is only designed for measurements with an order coefficient $n = 1$, the above mentioned changeover may naturally be dispensed with; since in this case also $f_2 = f_3$, it suffices to utilize a single tunable generator instead of two tunable generators 2 and 3 which are mechanically and electrically coupled, which permits to simplify considerably the required equipment.

In order to avoid that upon a change in the choice of the order coefficient $m$ it would also be necessary to modify the tuning frequency of the amplifier 13, either the frequency $nf_1$ or the frequency $f_4$ may be varied, when the coefficient $m$ is modified, by a similar amount, for example, by means of a number of trimmer condensers which are provided for this purpose in the generator concerned and which may be connected into circuit at will.

The frequency of the measuring signal $p$ should preferably be readable on a scale which co-operates with the actuating member 10. Since, when the generator 1 is detuned, it would be necessary to modify the scale by amounts $\mp mF$, the frequency $f_4$ of the generator 4 is preferably made variable in steps by an amount which corresponds to the frequency of the fixed measuring signal F or to a multiple thereof.

The measuring circuit represented may be made suitable in a simple manner for determining distortions caused by harmonics of the measuring signal $p$ by switching the generator 5 out of circuit, for example by means of a switch 15.

What I claim is:

1. Apparatus for measuring the distortion arising in a device due to intermodulation effects therein, said apparatus comprising means to generate a first measuring signal F of fixed frequency, means to generate a second measuring signal $p$ of adjustable frequency, means to apply said first and second measuring signals F and $p$ as an input to said device, means to generate an auxiliary measuring signal $q$ of adjustable frequency, means simultaneously to adjust frequencies $p$ and $q$ so that the relation $q + np$ exhibits a constant value, $n$ being a harmonic order coefficient, means to combine the auxiliary signal $q$ with the intermodulation product $np$ $mF$ yielded in the output of said device to produce a resultant signal having a frequency $q - (np \pm mF)$, $m$ being a harmonic order coefficient, and means to indicate the amplitude of the resultant signal.

2. Apparatus for measuring the distortion arising in a device due to intermoduation effects therein, said apparatus comprising means to generate a first measuring signal F of fixed frequency, means to generate a second measuring signal $p$ of adjustable frequency, means to apply said first and second measuring signals F and $p$ as an input to said device, means to generate an auxiliary measuring signal $q$ of adjustable frequency, means simultaneously to adjust frequencies $p$ and $q$ so that the relation $q + np$ exhibits a constant value, $n$ being a harmonic order coefficient, a mixer coupled to the output of said device and arranged to combine the intermodulation product therein of frequency $np \pm mF$, $m$ being a harmonic order coefficient, with the auxiliary signal $q$, and selective indicating means coupled to the output of said mixer for measuring the amplitude of the resultant frequency $q-(np \pm mF)$.

3. Apparatus, as set forth in claim 2, wherein said selective indicating means includes a selective amplifier coupled to said mixer and tuned to the frequency equal to $q-(np \pm mF)$, and a voltmeter connected to the output of said amplifier.

4. Apparatus for measuring the distortion arising in a device due to intermodulation effects therein, comprising means to generate a first measuring signal $F$ of fixed frequency, means to generate a second measuring signal $p$ of adjustable frequency and including a first wave generator providing a fixed frequency $f_1$, a second wave generator providing an adjustable frequency $f_2$, a first mixer for combining the outputs of the first and second generators and a filter for deriving the resultant frequency $p$ from the output of the first mixer, means to generate an auxiliary measuring signal $q$ of adjustable frequency and including a third wave generator providing a variable frequency $f_3$ which is equal to $nf_2$, $n$ being a harmonic order coefficient, a fourth wave generator providing a fixed frequency $f_4$, a second mixer for combining the outputs of said third and fourth generators and a filter for deriving the resultant frequency $q$ from the output of said second mixer, means simultaneously to adjust the frequency of said second and third generators, means to apply said first and second measuring signals $F$ and $p$ as an input to said device, a third mixer coupled to the output of said device and arranged to combine the intermodulation product therein of frequency $np \pm mF$, $m$ being a harmonic order coefficient, with the auxiliary signal $q$, and selective indicating means coupled to the output of said third mixer for measuring the amplitude of the resultant frequency $q-(np \pm mF)$.

5. Apparatus, as set forth in claim 4, wherein the frequency of one of the first and fourth generators providing frequencies $f_1$ and $f_4$, respectively, is adjustable in a step-wise manner, each step having an extent corresponding to a multiple of first measuring signal $F$.

6. Apparatus as set forth in claim 4, further including a switch interposed between said device and said means to generate the first measuring signal $F$.

7. Apparatus for measuring the distortion arising in a device due to intermodulation effects therein, comprising means to generate a first measuring signal $F$ of fixed frequency, means to generate a second measuring signal $p$ of adjustable frequency and including a first wave generator providing a fixed frequency of one value, a second wave generator providing an adjustable frequency, a first mixer for combining the outputs of same first and second generators and a filter for selecting the frequency $p$ from the output of said first mixer, means to generate an auxiliary measuring signal $q$ of adjustable frequency and including a third wave generator providing a fixed frequency of another value, a second mixer for combining the outputs of said second and third generators and a filter for selecting the value $q$ from said second mixer, means to apply said first and second measuring signal $F$ and $p$ as an input to said device, a third mixer coupled to said device to combine the intermodulation product therein of frequency $np \pm mF$, $m$ and $n$ being harmonic order coefficients, with auxiliary signal $q$, and selective indicating means coupled to the output of said third mixer for measuring the amplitude of the resultant frequency $q-(np \pm mF)$.

LOURENS BLOK.

REFERENCES CITED

The following references are of record in the file of this patent:

UNITED STATES PATENTS

| Number | Name | Date |
|---|---|---|
| Re. 22,150 | Bagno et al. | Aug. 4, 1942 |
| 2,380,791 | Rosencrans | July 31, 1945 |
| 2,416,310 | Hansen et al. | Feb. 25, 1947 |

OTHER REFERENCES

Hilliard, Proced. of the I. R. E., Dec. 1941, pages 614 to 620.